(12) United States Patent
Koo

(10) Patent No.: US 10,645,355 B2
(45) Date of Patent: May 5, 2020

(54) ELECTRONIC APPARATUS AND CONTROLLING METHOD THEREOF

(71) Applicant: SAMSUNG ELECTRONICS CO., LTD., Suwon-si (KR)

(72) Inventor: Ja-sung Koo, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/020,306

(22) Filed: Jun. 27, 2018

(65) Prior Publication Data

US 2019/0098273 A1    Mar. 28, 2019

(30) Foreign Application Priority Data

Sep. 22, 2017    (KR) .................... 10-2017-0122506

(51) Int. Cl.
| | |
|---|---|
| *H04N 5/46* | (2006.01) |
| *H04N 9/64* | (2006.01) |
| *H04N 9/873* | (2006.01) |
| *H04N 9/78* | (2006.01) |
| *H04N 7/10* | (2006.01) |
| *G09G 5/00* | (2006.01) |
| *H04N 21/442* | (2011.01) |
| *H04N 5/76* | (2006.01) |

(52) U.S. Cl.
CPC ............... *H04N 9/641* (2013.01); *G09G 5/00* (2013.01); *H04N 5/46* (2013.01); *H04N 7/10* (2013.01); *H04N 9/642* (2013.01); *H04N 9/78* (2013.01); *H04N 9/873* (2013.01); *H04N 21/44231* (2013.01); *H04N 5/76* (2013.01)

(58) Field of Classification Search
CPC .......... H04N 9/641; H04N 7/10; H04N 9/642; H04N 5/46
USPC ....................... 348/554, 555, 556, 552, 14.04
See application file for complete search history.

(56) References Cited

U.S. PATENT DOCUMENTS 10,116,896 B2 * 10/2018 Koo .......................... H04N 5/46
2003/0214604 A1   11/2003 Lee
(Continued)

FOREIGN PATENT DOCUMENTS

KR    10-2006-0116065 A    11/2006
KR       10-0651869 B1    12/2006
(Continued)

OTHER PUBLICATIONS

International Search Report (PCT/ISA/210) dated Nov. 26, 2018 issued by the International Searching Authority in International Application No. PCT/KR2018/009473.
(Continued)

*Primary Examiner* — Jefferey F Harold
*Assistant Examiner* — Jean W Desir
(74) *Attorney, Agent, or Firm* — Sughrue Mion, PLLC

(57) ABSTRACT

An electronic apparatus and a controlling method thereof are provided. The electronic apparatus includes a first port, a second port, and a processor configured to execute a component function based on the first port and the second port being connected to a cable respectively, execute a composite function based on the second port being connected to a cable and the first port being in a disconnection state, and execute an Ex-link function based on the first port being connected to a cable and the second port being in a disconnection state.

10 Claims, 7 Drawing Sheets

| FIRST PORT | SECOND PORT | COMPONENT FUNCTION | COMPOSITE FUNCTION | EX-LINK FUNCTION |
|---|---|---|---|---|
| 0 | 0 | × | × | AVAILABLE |
| 0 | 1 | × | ○ | × |
| 1 | 0 | × | × | AVAILABLE |
| 1 | 1 | ○ | × | × |

(56) References Cited

U.S. PATENT DOCUMENTS

2008/0291334 A1    11/2008   Baek
2012/0194442 A1     8/2012   Sheeley
2017/0187984 A1     6/2017   Koo

FOREIGN PATENT DOCUMENTS

| KR | 20-0439053 Y1 | 3/2008 |
| KR | 10-1562789 B1 | 10/2015 |
| KR | 10-2016-0006138 A | 1/2016 |
| KR | 10-2017-0075613 A | 7/2017 |

OTHER PUBLICATIONS

Written Opinion (PCT/ISA/237) dated Nov. 26, 2018 issued by the International Searching Authority in International Application No. PCT/KR2018/009473.

* cited by examiner

FIG. 4

| FIRST PORT | SECOND PORT | COMPONENT FUNCTION | COMPOSITE FUNCTION | EX-LINK FUNCTION |
|---|---|---|---|---|
| 0 | 0 | × | × | AVAILABLE |
| 0 | 1 | × | ○ | × |
| 1 | 0 | × | × | AVAILABLE |
| 1 | 1 | ○ | × | × |

ELECTRONIC APPARATUS AND CONTROLLING METHOD THEREOF

CROSS-REFERENCE TO RELATED APPLICATION(S)

This application is based on and claims priority under 35 U.S.C. § 119 to Korean Patent Application No. 10-2017-0122506, filed on Sep. 22, 2017, in the Korean Intellectual Property Office, the disclosure of which is incorporated herein by reference in its entirety.

BACKGROUND

1. Field

Aspects of the embodiments relate to an electronic apparatus and a controlling method thereof, and more particularly, to an electronic apparatus connected to an external apparatus and a controlling method thereof.

2. Description of Related Art

Due to developments in electronic technologies, various types of electronic apparatuses are being developed and provided. For example, electronic apparatuses such as televisions (TVs), which are one of the most commonly used home appliances, are been developed at a rapid pace.

As the performance of electronic apparatuses is gentrified, the types of contents provided by the electronic apparatuses has been diversified. For example, recent electronic apparatuses are connected to an external apparatus, receive various contents provided from the external apparatus, and provide the received content to a user. For example, an electronic apparatus such as a television (TV) may be connected to a set top box, receives a video signal or an audio signal from the set top box, processes and outputs the received video signal or audio signal, and thus, may provide various contents to a user. In addition, the TV may provide various contents stored in a personal computer (PC) by being connected to the PC.

A format of a signal transmitted by an external apparatus to an electronic apparatus may vary according to the type of the external apparatus, and thus, the electronic apparatus should use a port that corresponds to the type of the external apparatus.

For this, electronic apparatuses in the related art include individual ports for being connected to each respective external apparatus. However, as the number of external apparatus increases, the number of ports required in the electronic apparatus also increases, and thus there has been a problem that a production cost grows and an error of an operation occurs according to the complicate circuit configuration.

SUMMARY

Provided is an electronic apparatus which may be connected to a plurality of external apparatuses using one port, and a controlling method thereof.

Additional aspects will be set forth in part in the description which follows and, in part, will be apparent from the description, or may be learned by practice of the presented embodiments.

In accordance with an aspect of the disclosure, there is provided an electronic apparatus including a first port, a second port, and a processor configured to execute a component function based on the first port and the second port being connected to a cable respectively, execute a composite function based on the second port being connected to a cable and the first port being in a disconnection state, and execute an Ex-link function based on the first port being connected to a cable and the second port being in a disconnection state.

The first port may include a red color difference signal (Pr) pin configured to receive a red color difference signal of a component video and a blue color difference signal (Pb) pin configured to receive a blue color difference signal of the component video, and an Ex pin configured to receive an Ex-link signal, and the second port may include an SL pin configured to receive a left audio signal, an SR pin configured to receive a right audio signal, and Y/AV pin configured to receive a luminance signal (Y) and an AV signal.

The processor is further configured to: based on a first cable configured to transmit the red color difference signal and the blue color difference signal being connected to the first port, and a second cable configured to transmit the luminance signal and the AV signal being connected to the second port, execute the component function, based on the second cable being connected to the second port, and the first port being in a disconnection state, execute the composite function, and based on a third cable configured to transmit the Ex-link signal being connected to the first port, and the second port being in a disconnection state, execute an Ex-link function.

The processor includes a first terminal configured to receive the red color difference signal and the blue color difference signal, and a second terminal configured to receive the Ex-link signal, and the electronic apparatus may further include a switch configured to connect the first port and the first terminal based on the second port being connected to the second cable, and connect the first port and the second terminal based on the second port being in a disconnection state.

The electronic apparatus further includes a signal converter configured to change a size of a first signal received via the first port and transmit the first signal to the second terminal, and change a size of a second signal output via the second terminal and transmit the second signal to the first port.

In accordance with an aspect of the disclosure, there is provided a method for controlling an electronic apparatus, the method including detecting whether a cable is connected to at least one of a first port and a second port of the electronic apparatus, and executing a component function based on the first port and the second port being connected to a cable respectively, executing a composite function based on the second port being connected to a cable and the first port being in a disconnection state, and executing an Ex-link function based on the first port being connected to a cable and the second port being in a disconnection state.

The first port includes a red color difference signal (Pr) pin configured to receive a red color difference signal of a component video and a blue color difference signal (Pb) pin configured to receive a blue color difference signal of the component video, and an Ex pin configured to receive an Ex-link signal, and the second port includes an SL pin configured to receive a left audio signal, an SR pin configured to receive a right audio signal, and Y/AV pin configured to receive a luminance signal (Y) and an AV signal.

The executing the component function includes, based on a first cable configured to transmit the red color difference signal and the blue color difference signal being connected to the first port and a second cable configured to transmit the luminance signal and the AV signal being connected to the second port, executing the component function, the executing the composite function includes, based on the second cable being connected to the second port and the first port being in a disconnection state, executing the composite function, and the executing the Ex-link function includes, based on a third cable configured to transmit the Ex-link signal being connected to the first port and the second port being in a disconnection state, executing the Ex-link function.

The electronic apparatus includes a first terminal configured to receive the red color difference signal and the blue color difference signal, and a second terminal configured to receive the Ex-link signal, and the method further includes: connecting the first port and the first terminal based on the second port being connected to the second cable; and connecting the first port and the second terminal based on the second port being in a disconnection state.

The executing the Ex-link includes changing a size of a first signal received via the first port and transmitting the first signal to the second terminal, and changing a size of a second signal output via the second terminal and transmitting the second signal to the first port.

In accordance with an aspect of the disclosure, only with two ports, the electronic apparatus that may perform the composite function, the component function, and the Ex-link function may be provided, and a circuit configuration in the electronic apparatus may become simple and a production cost may be reduced accordingly.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 is a table illustrating an operation of an electronic apparatus when a cable is connected to at least one of a first port and a second port;

DETAILED DESCRIPTION

The present disclosure may have several embodiments, and the embodiments may be modified variously. In the following description, specific embodiments are provided with accompanying drawings and detailed descriptions thereof. However, this does not necessarily limit the scope of the embodiments to a specific embodiment form. Instead, modifications, equivalents and replacements included in the disclosed concept and technical scope of this specification may be employed. While describing embodiments, if it is determined that the specific description regarding a known technology obscures the gist of the disclosure, the specific description is omitted.

The terms such as "first," "second," and so on may be used to describe a variety of elements, but the elements should not be limited by these terms. The terms used herein are solely intended to explain specific embodiments, and not to limit the scope of the present disclosure.

The terms used herein are solely intended to explain a specific embodiment, and not to limit the scope of the present disclosure. Singular forms are intended to include plural forms unless the context clearly indicates otherwise. The terms, "include", "comprise", "is configured to", etc. of the description are used to indicate that there are features, numbers, steps, operations, elements, parts or combination thereof, and they should not exclude the possibilities of combination or addition of one or more features, numbers, steps, operations, elements, parts or combination thereof. As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

In the embodiments disclosed herein, a term 'module' or 'unit' refers to an element that performs at least one function or operation. The 'module' or 'unit' may be realized as hardware, software, or combinations thereof. In addition, a plurality of 'modules' or a plurality of 'units' may be integrated into at least one module and may be at least one processor except for 'modules' or 'units' that should be realized in a specific hardware.

Embodiments are described in detail with reference to the accompanying drawings.

Figure 1:
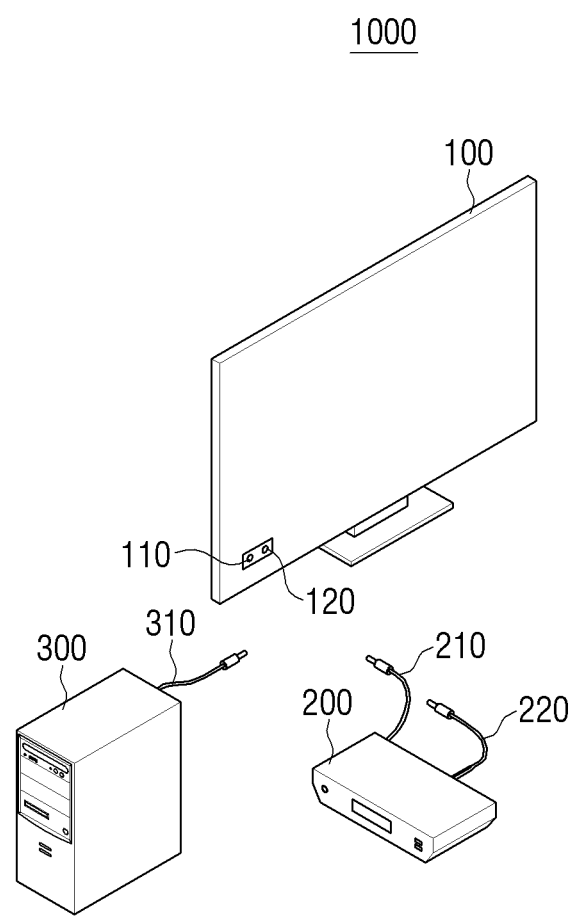
FIG. 1 is a view illustrating an electronic system according to an embodiment.

FIG. 1 is a view illustrating an electronic system according to an embodiment.

Referring to FIG. 1, the electronic system 1000 according to an embodiment may include an electronic apparatus 100, a video providing apparatus 200, and an external apparatus 300.

The electronic apparatus 100 may receive a video signal and an audio signal from the video providing apparatus 200, and process and output the received video signal and audio signal. In addition, the electronic apparatus 100 may receive a content from the external apparatus 300, and process and output the received content.

For example, the electronic apparatus 100 may be realized as a display apparatus which displays a video received from the video providing apparatus 200 or the external apparatus 300, and the display apparatus may be a TV. In the following embodiment, the electronic apparatus 100 is realized as a TV, but the electronic apparatus 100 may be realized as various electronic apparatuses that may display a video.

The video providing apparatus 200 may transmit a video signal and an audio signal to the electronic apparatus 100. For example, the video providing apparatus 200 may be realized as various types of apparatuses that may provide a video such as a set top box, a digital versatile disc (DVD) player, a video player and the like.

A format of a video signal transmitted by the video providing apparatus 200 to the electronic apparatus 100 may vary according to a transmission method.

For example, if the video signal is transmitted via a component method, one of an analogue video standard, the video providing apparatus 200 may transmit the video signal by dividing into three types of information. Specifically, if YPbPr color space is used, the video providing apparatus 200 may divide and transmit a luminance signal (Y), a red color difference signal (Pr) which shows a difference between the red color and luminance, and a blue color difference signal (Pb) which indicates a difference between the blue color and luminance, respectively. In addition, if a RGB color space is used, a red signal, a green signal, and a blue signal may divided and transmitted, respectively.

In addition, if the video signal is transmitted in a composite method which is another one of the analogue video standard, the video providing apparatus 200 may not divide the luminance signal and the color signal, and transmit these signals all together as one signal. The video signal in the composite method is called Composite video Blanking and Sync (CVBS).

As such, the format of the video signal transmitted by the video providing apparatus 200 to the electronic apparatus 100 is vary according to a transmission method, and thus, it is required that the electronic apparatus 100 should processes the received video signal individually according to a format. For this, the electronic apparatus 100 may include a first port 110 for receiving a component signal and a second port 120 for receiving a composite signal.

The external apparatus 300 may transmit various contents to the electronic apparatus 100. For example, the external apparatus 300 may be connected to the electronic apparatus 100 via an RSC-232C interface, and through this, various contents such as videos stored in the external apparatus 300 or web page screens to which the external apparatus 300 accessed may be transmitted to the electronic apparatus 100. Further, the external apparatus 300 may transmit the control signal for controlling the electronic apparatus 100 to the electronic apparatus 100. For example, the external apparatus 300 may transmit a control signal and the like for turning the power of the electronic apparatus 100 on/off to the electronic apparatus 100.

For example, the external apparatus 300 may be realized as various types of apparatuses which may provide a content such as a PC, a set top PC, a tablet PC, and the like. While it has been described that the external apparatus 300 is connected to the electronic apparatus 100 via the RSC-232C interface, the connection of the external apparatus 300 to the electronic apparatus 100 is not limited thereto. That is, the external apparatus 300 may be connected to the electronic apparatus 100 according to various interface standards.

A format of a signal transmitted by the external apparatus 300 to the electronic apparatus 100 may be different from the above described component signal and a composite signal. Accordingly, the electronic apparatus in the related art includes a port for processing the signal received from the external apparatus 300 separately.

However, there is a problem in this case that as a circuit in the electronic apparatus is complicated, a possibility of error increases, and a production cost of the product increases. Accordingly, the electronic apparatus 100 which may process the signal transmitted by the external apparatus 300 by using a port for receiving a component signal and a composite signal is required to be provided.

Figure 2:
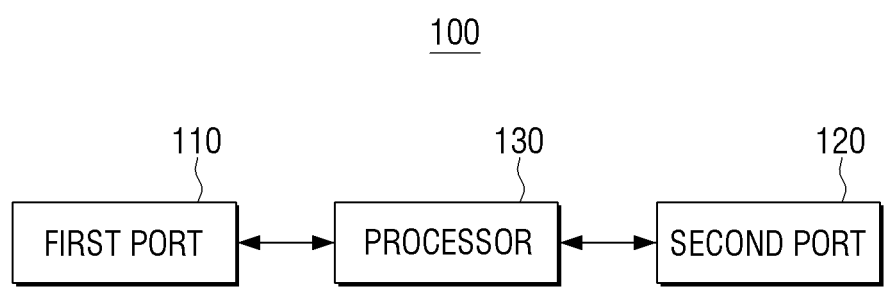
FIG. 2 is a block diagram illustrating an electronic apparatus according to an embodiment.

FIG. 2 is a block diagram illustrating an electronic apparatus according to an embodiment.

Referring to FIG. 2, the electronic apparatus 100 according to an embodiment includes a first port 110, a second port 120 and a processor 130.

The first port 110 may be connected to one of a cable that transmits a component signal and a cable that transmits an Ex-link signal. Here, the cable that transmits the component signal is a cable which is connected to the video providing apparatus 200 and transmits a video signal output in a component method, which may transmit a red color difference signal (Pr) and a blue color difference signal (Pb) to the processor 130. In addition, the cable which transmits the Ex-link signal may be connected to the external apparatus 300 and transmit a signal output via the RSC-232C interface. Here, the Ex-link signal may include information on the content provided by the external apparatus 300 or a command for controlling the electronic apparatus 200, as discussed above.

For this, the first port 110 may include the red color difference signal (Pr) pin and the blue color difference signal (Pb) pin for receiving a component video, and an Ex-link pin for receiving an Ex-link signal.

The first port 110 may be connected to a switch. Specifically, a switch may change the transmission channel of a signal transmitted via the first port 110 according to whether a cable is connected to the second port 120, and accordingly, the electronic apparatus 100 may execute the component function, the composite function, and the Ex-link function only with two ports. More detailed description thereof will be described with reference to FIG. 3.

A cable that transmits a composite signal may be connected to the second port 120. Here, the cable that transmits the composite signal is a cable that is connected to the video providing apparatus 200 and transmits a video signal output in a composite method, and may transmit a luminance signal (Y) and an AV signal to the processor 130.

For this, the second port 120 may include a Y/AV pin for receiving the luminance signal (Y) and the AV signal. Of course, the second port 120 may further include a pin for outputting an audio. Specifically, the second port 120 may further include an SL pin for receiving a left sound signal, and an SR pin for receiving a right sound signal.

The processor 130 controls an overall operation of the electronic apparatus 100. For this, the processor 130 may include one or more than one of a central processing unit (CPU), an application processor (AP), or a communication processor (CP).

First, the processor 130 may detect whether a cable is connected to at least one of the first port 110 and the second port 120. Specifically, the processor 130 may receive a signal transmitted from at least one of the first port 110 and the second port 120, and from this, may detect whether a cable is connected to at least one of the first port 110 and the second port 120.

In addition, the processor 130 may control the electronic apparatus 100 to execute different functions according to the cable connected to the first port 110 and the second port 120.

Specifically, the processor 130 may control the electronic apparatus 100 to execute the component function when a cable is connected to the first port 110 and the second port 120 respectively, to execute the composite function if a cable is connected to the second port 120 and the first port 110 is in a disconnection state (i.e., the port is not connected to a cable), and to execute the Ex-link function if a cable is connected to the first port 110 and the second port 120 is in a disconnection state.

More specifically, the processor 130 may control the electronic apparatus 100 to execute the component function if the first cable which transmits a red color difference signal and a blue color difference signal is connected to the first port 110 and the second cable that transmits a luminance signal and an AV signal is connected to the second port 120, execute the composite signal if the second cable that transmits a luminance signal and an AV signal is connected to the second port 120 and the first port 110 is in a disconnection state, and execute the Ex-link function if the third cable that transmits an Ex-link signal is connected to the first port 110 and the second port 120 is in a disconnection state.

Here, the composite function means a function that the processor 130 processes and outputs a video provided in a composite method by the video providing apparatus 200 such as a video player. Specifically, if a composite video signal (CVBS), that is, a luminance signal, a AV signal and sound signals (SL, SR) are received from the second port 120 and if it is determined that the first port 110 is in a disconnection state, the processor 130 may recognize this as an input of the composite signal and output the video corresponding to the composite signal.

In addition, the component function means that a processor 130 processes and outputs the video provided in a component function by the video providing apparatus 200 such as a set top box. Specifically, if the composite video signal (CVBS) and the audio signals (SL, SR) are received from the second port 120 and the blue color difference signal (Pb) and the red color difference signal (Pr), which are a component video signal, is received from the first port 110, the processor 130 recognizes this as an input of a component signal, and output a video corresponding to the component signal.

In addition, the Ex-link function means that the processor 130 processes and outputs the video provided from the external apparatus 300 such as a PC via an interface such as RSC-232C. Specifically, if the Ex-link signal is received from the first port 110 and it is determined that the second port 120 is in a disconnection state, the processor 130 may recognize this as an input of the Ex-link signal and control the electronic apparatus 100 to output a video corresponding to the Ex-link signal.

For example, if the Ex-link signal includes a command for turning on a power of the electronic apparatus 100, the processor 130 may output a video by turning on the power of the electronic apparatus 100, and if the Ex-link signal is for transmitting a content, the processor 130 may process the content received from the external apparatus 300 and output as a video.

Hereinafter, the operation of the electronic apparatus 100 described above will be described in detail with reference to FIG. 3.

Figure 3:
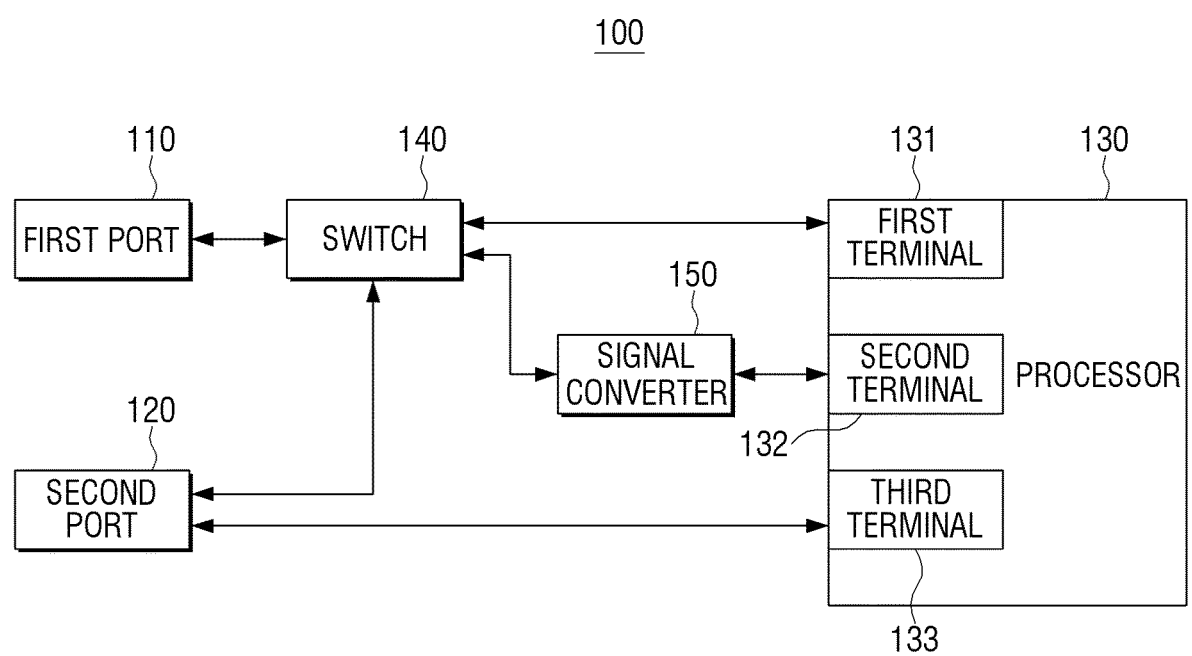
FIG. 3 is a detailed block diagram illustrating an electronic apparatus according to an embodiment.

FIG. 3 is a detailed block diagram for illustrating an electronic apparatus according to an embodiment.

Referring to FIG. 3, the electronic apparatus 100 according to an embodiment may include the first port 110, the second port 120, a processor 130, a switch 140 and a signal converter 150. Hereinafter, the description overlaps with the above described parts will be omitted or abbreviated.

As illustrated in FIG. 3, the processor 130 may include a first terminal 131, a second terminal 132, and a third terminal 133. Here, the first terminal 131 may be a terminal which is connected to the first port 110 for receiving the component signal, that is, the red color difference signal and the blue color difference signal, and the second terminal 132 may be a terminal which is connected to the first port 110 for receiving the Ex-link signal, and the third terminal 133 may be a terminal which is connected to the second port 120 for receiving a composite signal, that is, the luminance signal and the AV signal.

The switch 140 may switch a route of a signal transmitted between the first port 110 and the processor 130 according to whether a cable is connected to the second port 120. Specifically, if a cable is connected to the second port 120, the switch 140 may switch the route of a signal transmitted via the first port 110 toward the first terminal 131, and if a cable is not connected to the second port 120, that is, in a disconnection state, the switch 140 may switch the route of a signal transmitted via the first port 110 toward the second terminal 132.

For this, the switch 140 may be connected to the second port 120. Specifically, the switch 140 may receive the signal connected to the second port 120 and transmitted via the second port 120, and determine whether a cable is connected to the second port 120 according to whether there is a received signal.

Specifically, if a composite signal is received via the second port 120, the switch 140 may switch the route of a signal transmitted via the second port 120 toward the first terminal 131. In addition, if the composite signal is not received via the first port 110, the switch 120 may switch the route of the signal transmitted via the first port 110 toward the second terminal 132.

Accordingly, the processor 130 executes the component function if a cable transmitting a component signal is connected to the first port 110 and a cable transmitting a composite signal is connected to the second port 120, executes the composite function if a cable transmitting a composite signal to the second port 120 and the first port 110 is in a disconnection state, and executes the Ex-link function if a cable transmitting the Ex-link signal is connected to the first port 110 and the second port 120 is in a disconnection state.

The signal converter 150 may be connected between the switch 140 and the second terminal 132. Accordingly, the signal converter 150 may convert the size of the Ex-link signal received via the first port 110 and transmit the signal to the second terminal 132, and may convert the size of the signal output via the second terminal 130 and transmit the signal to the first port 110.

Specifically, the signal converter 150 may convert the size (e.g., logic level) of the Ex-link signal received via the first port 110 to a size which may be used in the electronic apparatus 100 and transmit the converted signal to the second terminal 132. Such signal converter 150 may be realized as a level shifter and the like.

In FIG. 3, it is described that the second port 120 is directly connected to the switch 140 and the switch 140 is switched according to whether a signal is received from the second port 120, but the switching method of the switch 140 is not limited thereto. For example, if the switch 140 is connected to the processor 130, the processor 130 may control the switch 140 according to whether a signal is received from the second port 120.

According to the above described embodiment, the circuit of the electronic apparatus 100 may be simplified because by using the first port 110 that receives a component signal and the second port 120 that receives a composite signal, also the Ex-link signal could be received. In addition, since an additional port is not required to receive the Ex-link signal, there is an effect that a production cost is reduced.

FIG. 4 is a table illustrating an operation of an electronic apparatus when a cable is connected to at least one of a first port and a second port.

Referring to FIG. 4, if a cable that transmits a component signal is not connected to the first port 110 and the cable that transmits a composite signal is not connected to the second port 120, the electronic apparatus 100 may execute the Ex-link function. Of course, if a cable that transmits the Ex-link signal is connected to the first port 110, the electronic apparatus 100 may execute the Ex-link function.

In addition, if a cable that transmits a component signal is not connected to the first port 110 and a cable that transmits the composite signal is connected to the second port 120, the electronic apparatus 100 may not execute the Ex-link function. In this case, the electronic apparatus 100 may execute the composite function.

In addition, if a cable that transmits a component signal is connected to the first port 110 and a cable that transmits a composite signal is not connected to the second port 120, the electronic apparatus 100 may execute the Ex-link function. Of course, if a cable for transmitting the Ex-link signal is connected to the first port 110, the electronic apparatus 100 may execute the Ex-link function.

In addition, if the cable that transmits a component signal is connected to the first port 110 and the cable that transmits the composite signal is connected to the second port 120, the electronic apparatus 100 may not execute the Ex-link function. In this case, the electronic apparatus 100 may execute the component function.

Figure 5:
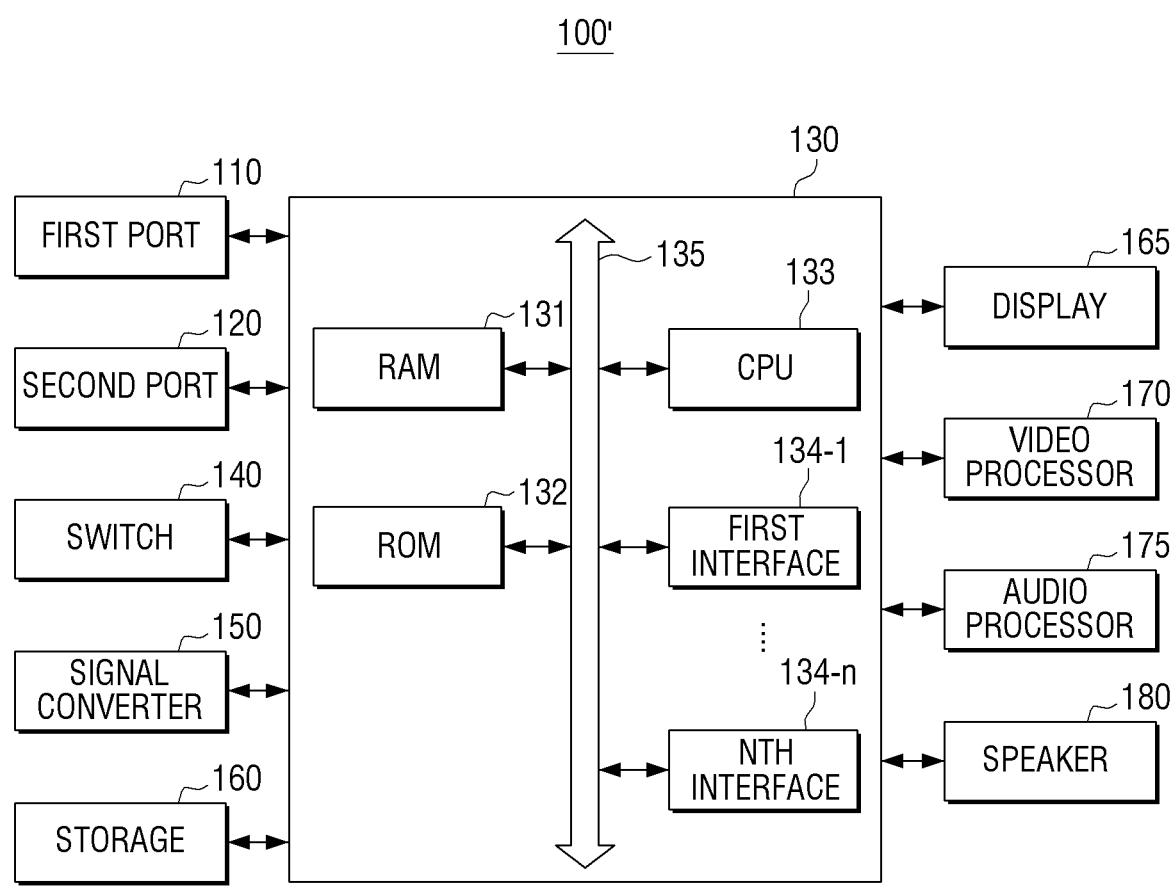
FIG. 5 is a detailed block diagram illustrating an electronic apparatus according to an embodiment.

FIG. 5 is a detailed block diagram illustrating an electronic apparatus according to an embodiment.

Referring to FIG. 5, the electronic apparatus 100' according to an embodiment may include the first port 110, the second port 120, the processor 130, the switch 140, the signal converter 150, the storage 160, the display 165, the video processor 170, the audio processor 175, and the speaker 180. Hereinafter the description overlaps with the above description will be omitted or abbreviated.

The processor 130 controls an overall operation of the electronic apparatus 100'.

Specifically, the processor 130 includes a random access memory (RAM) 131, a read only memory (ROM) 132, a central processing unit (CPU) 133, first through nth interfaces 134-1 through 134-n, and a bus 135. Here, the RAM 131, the ROM 132, the main CPU 133, the first through nth interfaces 134-1 through 134-n, etc. may be connected to one another through the bus 135.

The first to n(th) interfaces 134-1 to 134-n may be connected to the aforementioned various components. One of the interfaces may be realized as a network interface connected to an external apparatus through a network.

The main CPU 133 accesses the storage 160 and performs booting using the Operating System (O/S) stored in the storage 160. The main CPU 133 may perform various operations by using various types of programs, contents, and data, etc. stored in the storage 160.

Especially, the main CPU 133 may control the video processor 170 to convert the analogue signal input from the external apparatus to a digital signal. In addition, the main CPU 133 may control the audio processor 175 to process the audio signal input from the external apparatus to be a form which may be output from the speaker 180.

For this, the electronic apparatus 100' may further include a decoder (not illustrated) for decoding the video signal and the audio signal. The decoder (not illustrated) may be realized as a software decoder or a hardware decoder. In addition, the decoder (not illustrated) may further include a decoder for decoding a video signal and a decoder for decoding an audio signal, and one decoder may decode both of a video signal and an audio signal.

The RAM 131 stores a set of commands for system booting. When a turn-on command is input and power is provided, the main CPU 133 may copy the O/S stored in the storage 160 in the RAM 131 according to the command stored in the ROM 132 and execute the O/S for booting the system. When the booting is completed, the main CPU 133 may copy various programs stored in the storage 160 to the RAM 131 and execute the programs copied in the RAM 131 to perform various operations.

The operation of the processor 130 described above may be performed by the program stored in the storage 160.

The storage 160 may store various data such as an O/S software module and various types of multimedia contents for operating the electronic apparatus 100'.

Specifically, the storage 160 may store a base module for processing a signal transmitted from various hardware included in the electronic apparatus 100', a storage module for managing database or a registry, a graphic processing module for generating a screen of a layout, and security module, etc.

The display 165 displays various types of screens. Specifically, the display 165 may display the video corresponding to a component signal when the electronic apparatus 100' executes the component function, may display the video corresponding to a composite signal when the electronic apparatus 100' executes the composite function, and may display a content provided from an external apparatus when the electronic apparatus 100' executes the Ex-link function. In addition, the display 165 may process the broadcast signal transmitted from a terrestrial broadcasting company and display the video.

In addition, the display 165 may display the information on the function being executed by the electronic apparatus 100'. Specifically, the processor 130 may control the display 165 to display a message which indicates that a component function is being executed, when the electronic apparatus 100' executes the component function. In the same manner, when the electronic apparatus 100' executes a composite function, the processor 130 may control the display 165 to display a message that indicates that the composite function is being executed, and when the electronic apparatus 100' executes the Ex-link function, the processor may control the display 165 to display the message that indicates that the Ex-link function is being executed.

Accordingly, a user may receive a visual feedback on the information regarding the function being executed by the electronic apparatus 100', and may confirm whether a cable is properly connected to the port of the electronic apparatus 100'.

In this regard, the display 165 may be implemented as a Liquid Crystal Display Panel (LCD), an Organic Light Emitting Diodes (OLED) and the like, but it is not limited thereto.

The speaker 180 outputs various audio. For example, the speaker 180 may output the audio signal received from the video providing apparatus 200 and the external apparatus 300. One speaker 180 may be disposed at the main body of the electronic apparatus 100' or two speakers may be disposed at the side of the electronic apparatus 100', but the location in which the speaker is disposed and the number of the speaker are not limited thereto.

Figure 6:
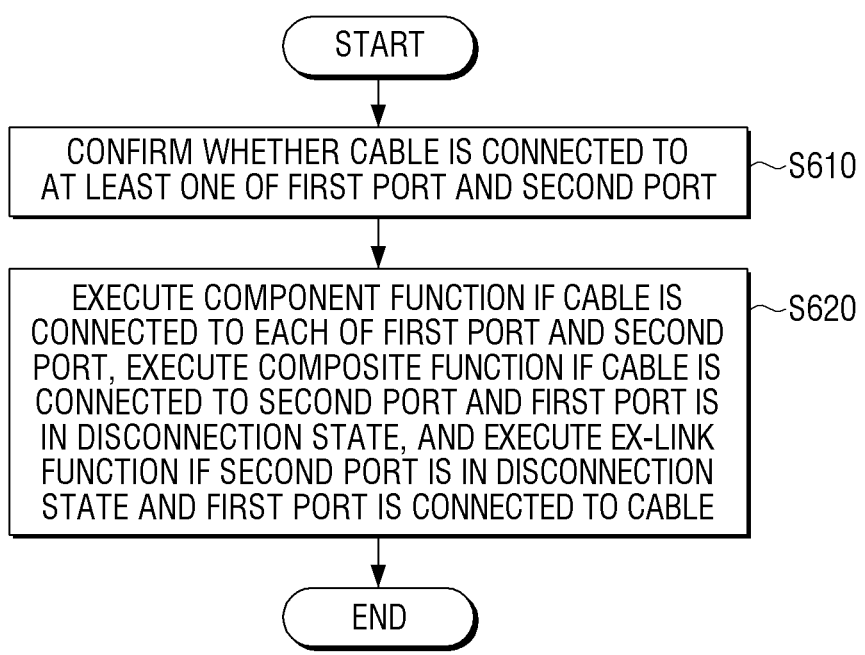
FIG. 6 is a flowchart illustrating an operation of an electronic apparatus according to an embodiment.

FIG. 6 is a flowchart illustrating an operation of the electronic apparatus according to an embodiment.

The electronic apparatus 100 may detect whether a cable is connected to at least of the first port 110 and the second port 120 in S610. Specifically, based on an electrical signal that flows via the first port 110 and the second port 120, the electronic apparatus 100 detects whether a cable is connected to at least one of the first port 110 and the second port 120.

In addition, the electronic apparatus 100 executes the component function when the cable is connected to each of the first port 110 and the second port 120, executes the composite function if the cable is connected to the second port 120 and the first port 110 is in a disconnection state, and executes the Ex-link function if the cable is connected to the first port 110 and the second port 120 is in the disconnection state, in S620.

Figure 7:
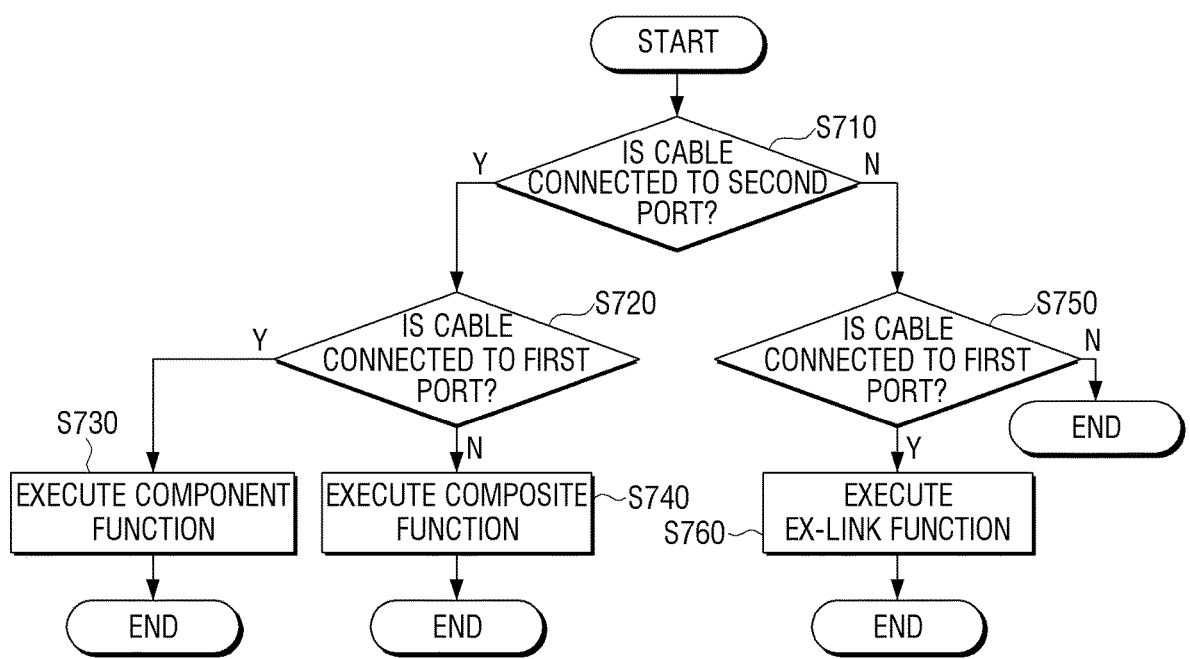
FIG. 7 is a detailed flowchart illustrating an operation of an electronic apparatus according to an embodiment.

FIG. 7 is a detailed flowchart for illustrating an operation of the electronic apparatus according to an embodiment.

The electronic apparatus 100 detects whether the cable is connected to the second port 120 in S710. Here, the cable connected to the second port 120 may be the cable that transmits a composite signal.

In addition, the electronic apparatus 100 detects whether the cable is connected to the first port 110 if it is detected that the cable is connected to the second port 120, in S720. As a result, if it is detected that the cable that transmits the component signal is connected to the first port 110, the electronic apparatus 100 may execute the component function in S730, and if it is determined that the cable is not connected to the first port 110, the electronic apparatus 100 may execute the composite function in S740.

If it is determined that the cable is not connected to the second port 120, the electronic apparatus 100 detects whether the cable is connected to the first port 110 in S750. In addition, if it is detected that the cable that transmits the Ex-link signal is connected to the first port 110, the electronic apparatus 100 may execute the Ex-link function in S760, and if it is detected that the cable is not connected to the first port 110, the electronic apparatus 100 may not execute any function.

The above-described controlling method according to various embodiments may be implemented in a program and provided to an electronic apparatus. In particular, the program including a controlling method may be stored in a non-transitory computer readable medium and provided therein.

The non-transitory computer readable medium is not a medium that stores data semi-permanently and which is readable by an apparatus. In detail, the above-described various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

The foregoing embodiments and advantages are example embodiments and are not to be construed as limiting the present disclosure. The present teaching can be readily applied to other types of apparatuses. Also, the description of the embodiments is intended to be illustrative, and not to limit the scope of the claims, and many alternatives, modifications, and variations will be apparent to those skilled in the art.

What is claimed is:

1. An electronic apparatus comprising:
   a first port;
   a second port; and
   a processor configured to execute a component function based on the first port and the second port being connected via a cable respectively with a first external apparatus, execute a composite function based on the second port being connected via a cable with a second external apparatus and the first port being in a disconnection state, and execute an Ex-link function based on the first port being connected via a cable with a third external apparatus and the second port being in a disconnection state,
   wherein the processor is further configured to receive a signal for controlling the electronic apparatus from the third external apparatus through the first port while performing the Ex-link function.

2. The electronic apparatus as claimed in claim 1, wherein the first port comprises a red color difference signal (Pr) pin configured to receive a red color difference signal of a component video and a blue color difference signal (Pb) pin configured to receive a blue color difference signal of the component video, and an Ex pin configured to receive an Ex-link signal, and
   wherein the second port comprises an SL pin configured to receive a left sound signal, an SR pin configured to receive a right sound signal, and Y/AV pin configured to receive a luminance signal (Y) and an AV signal.

3. The electronic apparatus as claimed in claim 2, wherein the processor is further configured to:
   based on a first cable configured to transmit the red color difference signal and the blue color difference signal being connected to the first port, and a second cable configured to transmit the luminance signal and the AV signal being connected to the second port, execute the component function,
   based on the second cable being connected to the second port, and the first port being in the disconnection state, execute the composite function, and
   based on a third cable configured to transmit the Ex-link signal being connected to the first port, and the second port being in the disconnection state, execute the Ex-link function.

4. The electronic apparatus as claimed in claim 3, wherein the processor comprises:
   a first terminal configured to receive the red color difference signal and the blue color difference signal; and
   a second terminal configured to receive the Ex-link signal, and
   wherein the electronic apparatus further comprises a switch configured to connect the first port and the first terminal based on the second port being connected to the second cable, and connect the first port and the second terminal based on the second port being in the disconnection state.

5. The electronic apparatus as claimed in claim 4, further comprising:
   a signal converter configured to change a size of a first signal received via the first port and transmit the first signal to the second terminal, and change a size of a second signal output via the second terminal and transmit the second signal to the first port.

6. A method for controlling an electronic apparatus, the method comprising:
   detecting whether a cable is connected to at least one of a first port and a second port of the electronic apparatus; and
   executing a component function based on the first port and the second port being connected via a cable respectively with a first external apparatus, executing a composite function based on the second port being connected via a cable with a second external apparatus and the first port being in a disconnection state, and executing an Ex-link function based on the first port being connected via a cable with a third external apparatus and the second port being in a disconnection state,
   wherein the executing the Ex-link function comprises receiving a signal for controlling the electronic apparatus from the third external apparatus through the first port while performing the Ex-link function.

7. The method as claimed in claim 6, wherein the first port comprises a red color difference signal (Pr) pin configured to receive a red color difference signal of a component video and a blue color difference signal (Pb) pin configured to receive a blue color difference signal of the component video, and an Ex pin configured to receive an Ex-link signal, and wherein the second port comprises an SL pin configured to receive a left sound signal, an SR pin configured to receive a right sound signal, and Y/AV pin configured to receive a luminance signal (Y) and an AV signal.

8. The method as claimed in claim 7, wherein the executing the component function comprises, based on a first cable configured to transmit the red color difference signal and the blue color difference signal being connected to the first port and a second cable configured to transmit the luminance signal and the AV signal being connected to the second port, executing the component function, wherein the executing the composite function comprises, based on the second cable being connected to the second port and the first port being in the disconnection state, executing the composite function, and wherein the executing the Ex-link function comprises, based on a third cable configured to transmit the Ex-link signal being connected to the first port and the second port being in the disconnection state, executing the Ex-link function.

9. The method as claimed in claim 8, wherein the electronic apparatus comprises a first terminal configured to receive the red color difference signal and the blue color difference signal, and a second terminal configured to receive the Ex-link signal, and wherein the method further comprises:

connecting the first port and the first terminal based on the second port being connected to the second cable; and connecting the first port and the second terminal based on the second port being in the disconnection state.

10. The method as claimed in claim 9, wherein the executing the Ex-link function comprises changing a size of a first signal received via the first port, transmitting the first signal to the second terminal, changing a size of a second signal output via the second terminal, and transmitting the second signal to the first port.

* * * * *